(12) United States Patent
Liebald

(10) Patent No.: US 8,777,530 B2
(45) Date of Patent: Jul. 15, 2014

(54) TOOL HOLDER FOR USE IN A MACHINE TOOL AND METHOD FOR OPERATING SUCH A TOOL HOLDER

(75) Inventor: Peter Liebald, Hilpoltstein (DE)

(73) Assignee: EMUGE-Werk Richard Glimpel GmbH & Co. KG Fabrik für Präzisionswerkzeuge, Lauf (DE)

( * ) Notice: Subject to any disclaimer, the term of this patent is extended or adjusted under 35 U.S.C. 154(b) by 355 days.

(21) Appl. No.: 13/229,257

(22) Filed: Sep. 9, 2011

(65) Prior Publication Data

US 2012/0061924 A1 Mar. 15, 2012

(30) Foreign Application Priority Data

Sep. 10, 2010 (DE) .......................... 10 2010 037 453
Sep. 28, 2010 (DE) .......................... 10 2010 037 822

(51) Int. Cl.
*B23Q 11/10* (2006.01)

(52) U.S. Cl.
USPC ............................................ 409/136; 408/57

(58) Field of Classification Search
CPC ...................................................... B23Q 11/10
USPC ............ 279/20; 408/56, 57, 59; 409/135, 136
See application file for complete search history.

(56) References Cited

U.S. PATENT DOCUMENTS

| 2,470,218 | A | * | 5/1949 | McNamara ..................... 279/20 |
| 5,676,506 | A | | 10/1997 | Sugata |
| 6,135,679 | A | | 10/2000 | Kazda |
| 6,905,294 | B2 | * | 6/2005 | Sugata et al. ................. 409/136 |
| 2007/0014647 | A1 | | 1/2007 | Watzke et al. |

FOREIGN PATENT DOCUMENTS

| DE | 4200808 A1 | * | 9/1993 | ............ B23Q 11/10 |
| DE | 19821186 C1 | | 3/2000 | |
| DE | 29624433 U1 | | 11/2003 | |
| DE | 102005050754 A1 | | 1/2007 | |
| JP | 05-212651 A | * | 8/1993 | ............ B23Q 11/10 |

* cited by examiner

*Primary Examiner* — Daniel Howell
*Assistant Examiner* — Ryan Rufo
(74) *Attorney, Agent, or Firm* — Workman Nydegger

(57) ABSTRACT

A tool holder has a first holder part for inserting into a receptacle in the machine tool and a second holder part for holding a tool. The tool holder has a conduit for directing a coolant and/or lubricant to the tool from a coolant and/or lubricant source. The tool has a conduit section for the coolant and/or lubricant for directing the latter to a machining point, and wherein, in the fitted state of the tool in the tool holder, the conduit is in contact with the conduit section at a coupling point. Provision is made for there to be an air feed line which directs compressed air from a compressed-air source into the region of the coupling point in such a way that the compressed air acts on the outer circumferential surface of the conduit and of the conduit section. Furthermore, methods for operating such a tool holder are described.

9 Claims, 3 Drawing Sheets

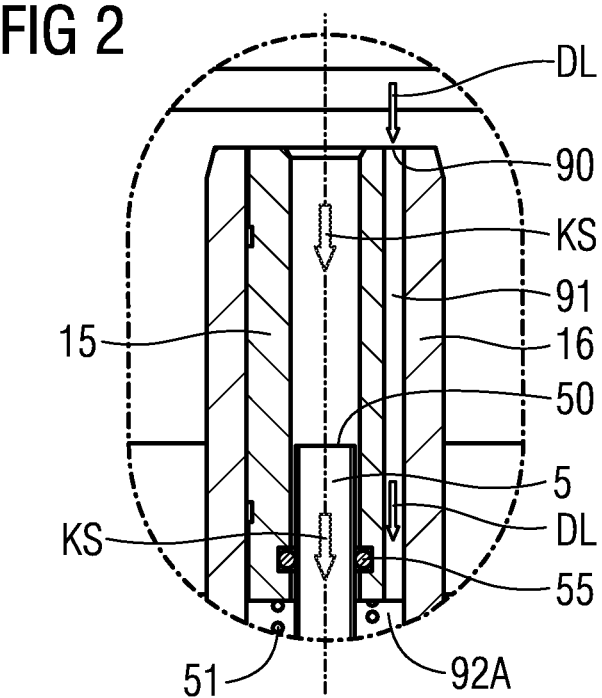
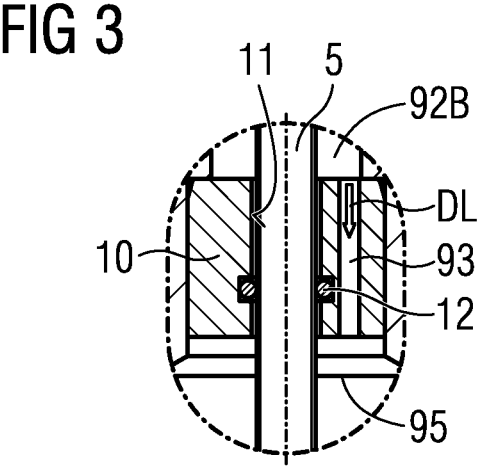

TOOL HOLDER FOR USE IN A MACHINE TOOL AND METHOD FOR OPERATING SUCH A TOOL HOLDER

CROSS-REFERENCE TO RELATED APPLICATIONS

This application claims the benefit of and priority to German Patent Application No. 10 2010 037 453.9, filed Sep. 10, 2010, and German Patent Application No. 10 2010 037 822.4, filed Sep. 28, 2010, the contents of each of which are hereby incorporated by reference in their entirety.

BACKGROUND OF THE INVENTION

1. The Field of the Invention

The invention relates to a tool holder for holding a tool and for rotationally coupling the tool to a machine tool, wherein the tool holder has a conduit for directing a coolant and/or lubricant through to the tool from a coolant and/or lubricant source, wherein the tool has a conduit section for directing the coolant and/or lubricant to a machining point, and wherein, in the fitted state of the tool in the tool holder, the conduit of the tool holder is in contact with the conduit section of the tool at a coupling point, such that coolant and/or lubricant flows or can flow from the conduit of the tool holder into the conduit section of the tool. Furthermore, the invention relates to a method for operating such a tool holder.

2. The Relevant Technology

A tool holder of this type is known from DE 296 24 433 U1. Here, a spindle device for a machine tool is described in which two feed path systems for separately directing air and liquid into a spindle are provided. Furthermore, a mist-generating device is provided which mixes air and liquid fed through this feed path system and discharges a mist-like mixture in order to lubricate or cool the tool at its machining point. It has proved successful, with such "minimum quantity lubrication", to use said oil mist for cooling or lubricating the tool in order to ensure effective machining by the tool with an adequate tool life.

In a design of the type mentioned at the beginning, the conduit is placed against the conduit section in an axially abutting manner in order to be able to supply the machining point with coolant and/or lubricant even in an interchangeable tool. In this case, it has been recognized as a disadvantage that segregation of the oil mist can take place in the event of leakages at the coupling point between conduit and conduit section, i.e. the oil can separate from the oil mist and lead to contamination of the tool holder. To the same degree, the oil in the cooling lubricant is of course reduced in this case, which has corresponding negative effects on the cutting process.

A tapping chuck for a tap with minimum quantity lubrication is known from DE 198 21 186 C1, which tapping chuck has an axially central lubricant passage with an axially displaceable coolant tube for a lubricant aerosol and a machine-side minimum quantity lubrication source, from which the lubricant aerosol is directed to the longitudinal bore of the tap. The coolant tube is pressed into its engagement position against the longitudinal bore of the tap by the aerosol pressure acting on its inner end faces, irrespective of the axial position of the tap, and is preloaded outwards by a spring. As a result, the sealing effect at the coupling point between coolant tube and tap is improved.

DE 10 2005 050 754 B4 discloses a tool holder for minimum quantity lubrication in which a coolant and/or lubricant tube for an aerosol provided as coolant and/or lubricant bears against a sealing ring inserted in the tool for sealing said coolant and/or lubricant tube at the end face thereof.

BRIEF SUMMARY OF THE INVENTION

The object of the present invention, then, is to configure a tool holder of the type mentioned at the beginning in such a way that it becomes possible to seal the coupling point between conduit and conduit section in a simple and efficient manner, such that in particular an escape of coolant and/or lubricant at the coupling point can be at least largely avoided. Furthermore, a corresponding method for operating a tool holder is to be proposed.

The achievement of this object by the invention is characterized according to claim 1 in that there is a gas feed line, in particular an air feed line, which directs compressed gas, in particular compressed air, from a compressed gas source, in particular a compressed air source, into the region of the coupling point in such a way that the compressed gas, in particular the compressed air, acts there on the outer surfaces (or outer circumferential surfaces) of the conduit of the tool holder and on the outer surfaces (or outer circumferential surfaces) of the conduit section of the tool and prevents an escape of coolant and/or lubricant at the coupling point.

This air acts from outside as sealing air on the conduit and on the conduit section at the coupling point, and therefore it is ensured in this way that no coolant and/or lubricant escapes from the conduit or from the conduit section.

The coolant and/or lubricant is in particular an oil mist or an oil aerosol, as used in particular in minimum quantity lubrication.

Advantages configurations and developments follow from the dependent claims.

According to the invention, in the method for operating such a tool holder as proposed in claim 7, a coolant and/or lubricant is directed at least from time to time from the coolant and/or lubricant source to the tool via the conduit, wherein, at least during the feeding of the coolant and/or lubricant, air under pressure is fed in via the air feed line and delivered to the coupling point between the conduit and the conduit section.

In this case, provision is preferably made for the pressure of the air delivered to the coupling point to be at least as high at the coupling point as the pressure in the interior of the conduit or of the conduit section in the region of the coupling point in order to achieve optimum sealing.

The effect achieved with this configuration or this procedure is that a sealing air shield builds up around the outer circumference of the conduit and of the conduit section in the region of the coupling point, and so it is not possible for oil mist to escape at the coupling point or for oil to escape from the oil mist and for this to lead to contamination or to the oil mist losing oil.

Accordingly sealing of the coupling point is achieved in a simple manner, and this sealing works efficiently and can be realized in a simple manner.

BRIEF DESCRIPTION OF THE DRAWINGS

Exemplary embodiments of the invention are shown in the drawing, in which:

FIG. 2 shows the detail "W" according to FIG. 1, FIG. 3 shows the detail "X" according to FIG. 1.

DETAILED DESCRIPTION OF THE PREFERRED EMBODIMENTS

Figure 1:
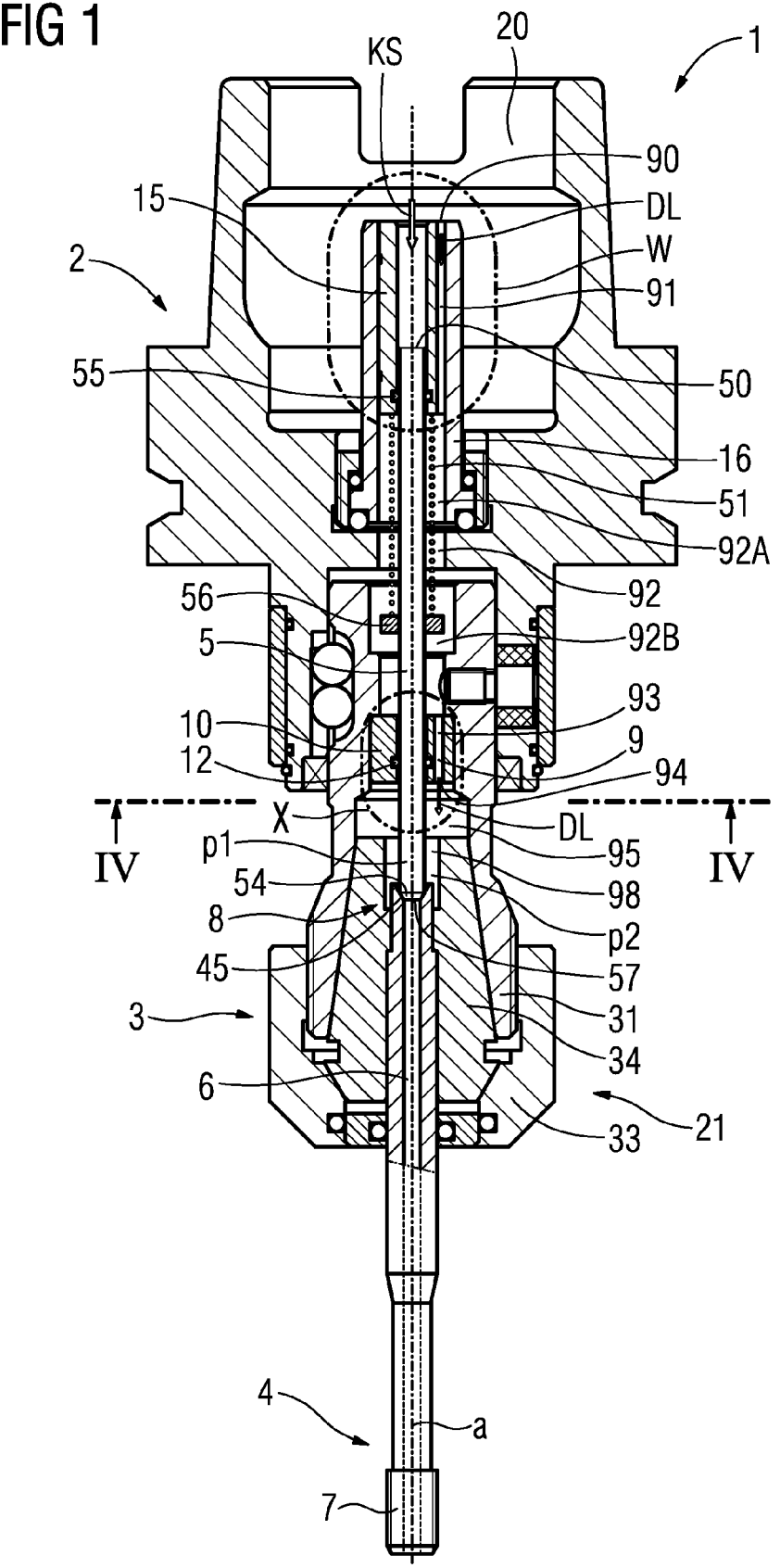
FIG. 1 shows, in a sectional illustration, a tool holder with tool according to a first embodiment of the invention.
Figure 4:
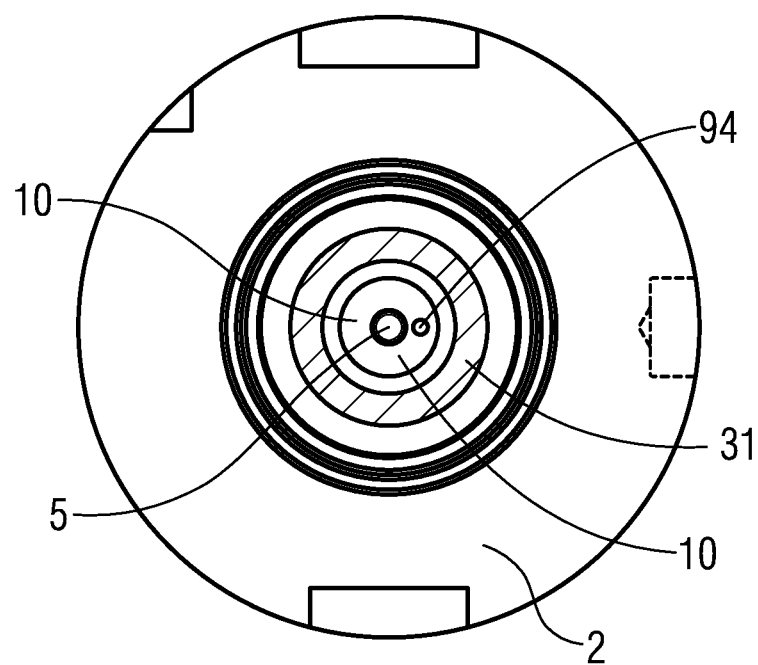
FIG. 4 shows a sleeve element with coolant tube in section IV-IV according to FIG. 1.

A first exemplary embodiment of the tool holder 1 proposed according to the invention is shown in FIGS. 1 to 4. The tool holder 1 is coupled on a spindle side 20 to a drive spindle (not shown) of a machine tool (not shown) and holds a tool 4 on a tool side 21 and couples said tool 4 in a rotational coupling to the drive spindle of the machine tool, such that the tool can be or is rotationally driven about a rotation axis a by the drive spindle via the tool holder 1. The tool 4 is preferably a tap and the tool holder 1 is preferably a tapping chuck, but the tool 4 can also be a cold-forming tap, thread milling cutter or also any other rotating tool working with a cutting or non-cutting action.

In the embodiment shown, the tool holder 1 is of substantially two-piece design and comprises a first holder part 2, which has the spindle side 20 and is designed for coupling to the drive spindle of the machine tool, and also a second holder part 3, which has the tool side 21 and is designed for holding the tool 4 and which is rotationally coupled to the first holder part 2 and permits, in a manner known per se, certain axial length compensation by means of limited axial mobility relative to the first holder part 2, while at the same time being coupled for conjoint rotation, and by means of a length compensation spring 51 which acts towards the tool 4. However, a one-piece embodiment of the tool holder 1 and/or an embodiment without length compensation is also possible.

In the exemplary embodiment shown, the tool 4 is clamped in place in a collet 34, which is clamped in place or compressed from outside by a clamping sleeve or insert sleeve 31 in a manner known per se via, for example, tapered clamping surfaces by means of a clamping nut 33 screwed onto the insert sleeve 31. The insert sleeve 31 is in turn coupled in a manner known per se to the first holder part 2 for conjoint rotation. The insert sleeve 31, collet 34 and clamping nut 33 belong to the second holder part 3.

After the tool 4 has been fitted into the tool holder 1 and the tool holder 1 has in turn been inserted into the machine tool, the spindle (not shown) of the machine tool rotates the tool holder 1 together with tool 4 about the rotation axis a. By corresponding axial feed with respect to the rotation axis a, the machining side 7 of the tool 4 is brought into contact with the workpiece to be machined, e.g. in order to cut a thread.

It is important that the machining point 7 of the tool 4 is adequately supplied with coolant and/or lubricant KS, for which purpose there is a coolant and/or lubricant supply line which comprises a conduit 5 which extends in the tool holder 1 coaxially to the rotation axis a and a conduit section 6, connected in series with the conduit 5, in the tool 4.

The conduit 5 of the tool holder 1 and the conduit section 6 of the tool 4 are fluidically connected to one another at a coupling point 8, and the outlet opening 57 of the conduit 5 opens into the conduit section 6 or is connected to the latter. In particular, the conduit 5 of the tool holder 1 and the conduit section 6 of the tool 4 abut against one another at the end faces at the coupling point 8, i.e. the end face 54 of the conduit 5 and the end face 45 of the tool 4 around the conduit section 6 bear against one another over a surface area, for example via complementary bearing surfaces, which, for example, can be of conical design, such that a certain degree of sealing is achieved.

Coolant and/or lubricant KS which is fed under pressure into the conduit 5 at the inlet opening 50 thereof in the upper region therefore reaches the machining point 7 via the conduit 5 and then via the conduit section 6.

The conduit 5 is designed in particular as an elongated tube (coolant tube) and runs from the tool 4 through the interior space of the insert sleeve 31 and the interior space of the first holder part 2 up to a guide sleeve 15, in which it is axially displaceable in a sealed manner via a seal 55 and has the inlet opening 50 for the coolant and/or lubricant KS. The length compensation spring 51 rests on a spring bearing ring 56 on the outer side of the conduit 5.

On the outlet side, the end of the conduit 5 plunges into a recess in the collet 34 and rests there with the end face 54 on the end face 45 of the tool 4. The recess in the collet 34 forms a surrounding space 98 for the coupling point 8. The surrounding space 98 is sealed in a pressure-proof manner by the clamped tool 4 and opens into an interior space 95 of the insert sleeve 31, which interior space 95 is adjacent to the surrounding space 98, is located above the collet 34 and is larger in diameter. The interior space 95 is closed off at the top, or on the side facing away from the surrounding space 98, by a sleeve element 10 which surrounds the conduit 5. The sleeve element 10 has a central leadthrough (or bore) 11, running axially with respect to the rotation axis a, for the conduit 5 and is sealed all around on the conduit 5 via a seal 12.

Following the sleeve element 10 or above the sleeve element 10, the conduit 5 runs inside a further cavity of the insert sleeve 31, said cavity accommodating the second sub-passage 92B of a second passage 92 and the spring bearing ring 56 of the conduit 5. A first sub-passage 92A of the second passage 92, which first sub-passage 92A follows at the top or follows the second sub-passage 92B, runs around the conduit 5 inside the first holder part 2 and the retaining sleeve 16, in which the guide sleeve 15 for the conduit 5 is arranged, and accommodates most of the length compensation spring 51.

In particular an oil mist or an oil aerosol, i.e. oil to which air is added, said oil being present in the form of tiny droplets in the air, is now used as coolant and/or lubricant KS.

In particular on account of the segregation of the oil and the air inside the conduit 5 and in particular at the coupling point 8 to the conduit section 6, the coolant and/or lubricant KS can escape at the coupling point 8, despite the end faces 54 and 45 which bear against one another, and oil can collect in the surrounding space 98 and also in the interior space 95 and can also escape from the tool holder 1.

So that none of the oil mist of the coolant and/or lubricant KS can escape at the coupling point 8, compressed air DL is admitted according to the invention to the surrounding space 98 around the coupling point 8, said compressed air DL acting from outside on the outer surfaces of the conduit 5 and on the outer surfaces of the conduit section 6 of the tool 4. The compressed air DL prevents the coolant and/or lubricant KS from escaping at the coupling point 8. To this end, the pressure p2 of the compressed air DL is preferably set at least as high as the pressure p1 of the coolant and/or lubricant KS prevailing in the interior of the conduit 5 and of the conduit section 6 at the coupling point 8.

The pressure p1 of the coolant and/or lubricant KS is typically between 4 bar and 6 bar, and so the pressure p2 of the compressed air DL should be set correspondingly high or higher. However, an approximately equal pressure p2=p1 is already sufficient, and therefore the compressed-air source used for producing the oil mist of the coolant and/or lubricant KS can also be used for sealing at the coupling point 8. The compressed air DL is applied, as it were, as sealing air to the outer circumference or the outer surface of conduit 5 and conduit section 6 at the coupling point 8, such that no oil mist can escape from the conduit 5 or from the conduit section 6.

To feed the compressed air DL, a compressed-air feed line 9, which comprises various sections or sub-passages 91, 92, 93, 95 and 98, is now provided in the tool holder 1.

In the exemplary embodiments shown, the compressed air DL provided as sealing air is directed forwards to the coupling point 8 in the compressed-air feed line 9 parallel to the coolant and/or lubricant KS and thus outside the conduit 5.

First of all, as shown in FIGS. 1 and 2, the compressed air DL is injected from a compressed-air source (not shown) through an inlet opening 90 into a first passage 91, running parallel to the conduit 5 and eccentrically to the rotation axis a, in or on the wall of the guide sleeve 15 or between guide sleeve 15 and retaining sleeve 16 and flows through this first passage 91 into the second passage 92 and then through the second passage 92, that is to say first through the first sub-passage 92A and then through the second sub-passage 92B, up to the sleeve element 10.

According to FIGS. 1 and 3, a third passage 93 is now formed in the sleeve element 10, and this third passage 93 runs in the sleeve element 10 from the side adjoining the second sub-passage 92B parallel to the rotation axis a and eccentrically to the leadthrough 11 for the conduit 5 and opens with an outlet opening 94 into the interior space 95 in the insert sleeve 31. Finally, the compressed air DL passes from the interior space 95 into the surrounding space 98 at the coupling point 8.

Since the interior space 95 and the surrounding space 98, except for the third passage 93, at which the compressed air DL is applied at the pressure p2, are otherwise closed in a pressure-proof manner, the pressure p2 of the compressed air DL substantially prevails in the surrounding space 98 and in the interior space 95, said pressure p2 being opposed to the internal pressure p1 in the entire region of the coupling point 8.

Figure 5:
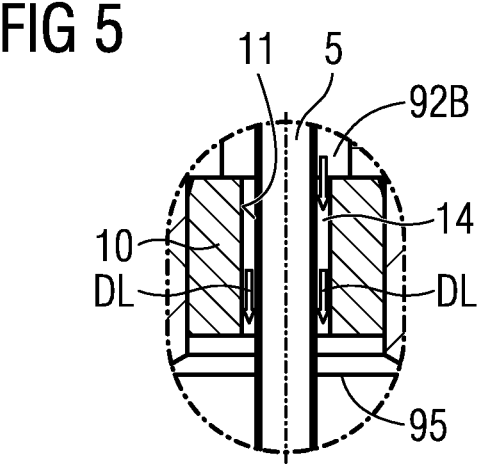
FIG. 5 shows an alternative embodiment of a sleeve element with coolant tube in a section.

A configuration of the compressed-air leadthrough on the sleeve element 10 as an alternative to the configuration in FIG. 3 can be seen in FIG. 5. The leadthrough 11 for the conduit 5 in the sleeve element 10 is now designed to be larger in diameter than the outside diameter of the conduit 5 and is not sealed by a sealing ring 12 as in FIG. 3. As a result, according to FIG. 5, there is formed between sleeve element 10 and conduit 5 an annular gap or air passage gap 14 which opens into the interior space 95 and through which the compressed air DL flows or can flow from the second sub-passage 92B into the interior space 95, instead of through the third passage 93 in FIG. 3.

The tool holder 1 shown is otherwise of a known design, and therefore further explanation in this respect can be dispensed with, especially since the scope of the present invention primarily concerns the sealing of the coupling point by means of sealing air.

In addition to the purely axial feeding of the compressed air, the compressed air can also be directed, for example, laterally to the tool holder 1.

LIST OF DESIGNATIONS

1 Tool holder
2 First holder part
3 Second holder part
4 Tool
5 Conduit
6 Conduit section
7 Machining point
8 Coupling point
9 Air feed line
10 Sleeve element
11 Bore
12 Sealing element (O-ring)
13 Through bore
14 Air passage gap
15 Guide sleeve
16 Retaining sleeve
20 Spindle side
21 Tool side
31 Insert sleeve
33 Clamping nut
34 Collet
50 Inlet opening
51 Length compensation spring
55 Sealing ring
56 Spring bearing ring
57 Outlet opening
90 Inlet opening
91 First passage
92 Second passage
93 Third passage
94 Outlet opening
95 Interior space
98 Surrounding space
a Rotation axis
DL Compressed air
KS Coolant and/or lubricant
p Pressure

I claim:
1. Tool holder for holding a tool and for rotationally coupling the tool to a drive spindle of a machine tool, wherein:
 a) the tool holder has a conduit for directing a coolant and/or lubricant through to the tool,
 b) the tool has a conduit section for directing the coolant and/or lubricant to a machining point, and
 c) in a fitted state of the tool in the tool holder, the conduit of the tool holder is in continuous contact with the conduit section of the tool at a coupling point, such that coolant and/or lubricant flows or can flow from the conduit of the tool holder into the conduit section of the tool, characterized in that
 d) there is a gas feed line, which directs compressed gas, into the region of the coupling point in such a way that the compressed gas, acts at the coupling point on the outer surface of the conduit of the tool holder and on the outer surface of the conduit section of the tool and prevents an escape of coolant and/or lubricant at the coupling point.

2. Tool holder according to claim 1, comprising at least one of the following features or any desired combination of the following features:
 a) the tool holder together with the held tool, is rotationally driven or can be rotationally driven about a rotation axis by the drive spindle,
 b) the tool is a thread-generating tool,
 c) the tool holder comprises a first holder part for coupling to the drive spindle of the machine tool and a second holder part for holding the tool, said second holder part being rotationally coupled to the first holder part, with axial length compensation between first holder part and second holder part or with a length compensation spring which acts on the second holder part towards the tool,
 d) the tool is clamped or can be clamped in place in a collet which is compressed or can be compressed from outside by an insert sleeve by means of a clamping nut screwed onto the insert sleeve,
 e) the conduit of the tool holder and the conduit section of the tool abut against one another at the end faces at the coupling point and the end faces thereof bear against one another over a surface area via complementary bearing surfaces, f) the coolant and/or lubricant comes from a coolant and/or lubricant source and/or the conduit is connected to a coolant and/or lubricant source, g) the compressed gas, comes from a compressed-gas source, or the gas feed line, is connected to the compressed-gas source, h) the conduit and the conduit section run coaxially to the rotation axis, at least in the region of the coupling point, i) the conduit runs coaxially to the rotation axis over its entire length between inlet opening and outlet opening and/or is designed as an elongated straight tube, j) the conduit is axially guided in its end region with the inlet opening in a guide sleeve and is sealed relative to the latter via a seal, k) the conduit runs through the interior space of the insert sleeve and through the interior space of the first holder part up to the guide sleeve, l) the length compensation spring rests on a spring bearing ring on the outer side of the conduit, the other end of said length compensation spring resting on the guide sleeve, m) the coolant and/or lubricant provided is an oil mist or an oil aerosol.

3. Tool holder according to claim 2, in which:

a) a sleeve element is provided which has a leadthrough, running axially with respect to the rotation axis, for the conduit, wherein b) the sleeve element is sealed all around on the conduit at the leadthrough via a seal or has a continuous passage as part of the gas feed line said passage running through the sleeve element or c) a continuous air passage gap which is part of the gas feed line is formed between the leadthrough of the sleeve element and the outer wall of the conduit.

4. Tool holder according to claim 3, comprising at least one of the following features or any desired combination of the following features:

a) a surrounding space, is formed around the coupling point, into which surrounding space the compressed air is directed or in which the gas feed line, ends, b) the surrounding space is formed in a recess in the collet, c) an interior space adjoins the surrounding space, d) the surrounding space or the interior space is closed off on the side facing away from the coupling point by the sleeve element which surrounds the conduit, e) the continuous passage formed in the sleeve element, as part of the gas feed line, opens with an outlet opening into the interior space, or directly into the surrounding space at the coupling point, f) the air passage gap formed between the leadthrough of the sleeve element and the conduit opens into the interior space, or directly into the surrounding space at the coupling point.

5. Tool holder according to claim 3, comprising at least one of the following features or any desired combination of the following features:

a) following the sleeve element, the conduit runs inside a cavity of the tool holder between the second holder part and the first holder part, which cavity forms at least partly a passage as part of the gas feed line, b) a passage, as part of the gas feed line, runs, in or on the wall of the guide sleeve or between guide sleeve and a retaining sleeve.

6. Tool holder according to claim 2, in which the pressure of the compressed gas at the coupling point or in the surrounding space is set at the same level as or higher than the pressure prevailing in the interior of the conduit and the conduit section at the coupling point.

7. Method for operating a tool holder according to claim 1 in a machine tool, wherein a coolant and/or lubricant is directed at least from time to time from the coolant and/or lubricant source to the tool via the conduit, wherein, at least during the feeding of the coolant and/or lubricant, compressed gas is fed via the gas feed line and delivered to the coupling point between the conduit and the conduit section, wherein the pressure of the air delivered to the coupling point is at least as high at the coupling point as the pressure in the interior of the conduit or of the conduit section in the region of the coupling point.

8. Tool holder according to claim 1, wherein the gas is air.

9. Tool holder for holding a tool and for rotationally coupling the tool to a drive spindle of a machine tool, wherein:

a) the tool holder has a conduit for directing a coolant and/or lubricant through to the tool, b) the tool has a conduit section for directing the coolant and/or lubricant to a machining point, and c) in a fitted state of the tool in the tool holder the tool is clamped in place in a collet and the conduit of the tool holder is in continuous contact with the conduit section of the tool at a coupling point, such that coolant and/or lubricant flows from the conduit of the tool holder into the conduit section of the tool, wherein d) the conduit of the tool holder and the conduit section of the tool abut against one another at the end faces at the coupling point and the end faces thereof bear against one another over a surface area, via complementary bearing surfaces, e) there is a gas feed line, which directs compressed gas into the region of the coupling point in such a way that the compressed gas acts at the coupling point on the outer surface of the conduit of the tool holder and on the outer surface of the conduit section of the tool and prevents an escape of coolant and/or lubricant at the coupling point, f) a surrounding space sealed in a pressure-proof manner by the clamped tool, is formed around the coupling point, in which surrounding space the gas feed line ends and the surrounding space is formed in a recess in the collet, and g) the pressure of the compressed gas at the coupling point is set at the same level as or higher than the pressure prevailing in the interior of the conduit and the conduit section at the coupling point.

* * * * *